(12) United States Patent
Mathew et al.

(10) Patent No.: US 12,536,138 B2
(45) Date of Patent: Jan. 27, 2026

(54) FILE SYSTEM REDIRECTOR SERVICE IN A SCALE OUT DATA PROTECTION APPLIANCE

(71) Applicant: Dell Products L.P., Round Rock, TX (US)

(72) Inventors: George Mathew, Belmont, CA (US); Donna Barry Lewis, Holly Springs, NC (US); Poornima Gupte, Pune (IN); Vikas Chaudhary, Pune (IN); Ajey Godbole, Pune (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/428,717

(22) Filed: Jan. 31, 2024

(65) Prior Publication Data

US 2025/0245200 A1    Jul. 31, 2025

(51) Int. Cl.
*G06F 16/172*    (2019.01)
*G06F 16/11*    (2019.01)
*G06F 16/174*    (2019.01)
*G06F 16/182*    (2019.01)

(52) U.S. Cl.
CPC .......... *G06F 16/172* (2019.01); *G06F 16/122* (2019.01); *G06F 16/1748* (2019.01); *G06F 16/1827* (2019.01)

(58) Field of Classification Search
None
See application file for complete search history.

(56) References Cited

U.S. PATENT DOCUMENTS

| 6,950,848 | B1 * | 9/2005 | Yousefi'zadeh | H04L 67/101 709/217 |
|---|---|---|---|---|
| 11,153,374 | B1 * | 10/2021 | Yu | H04L 67/1008 |
| 11,973,823 | B1 * | 4/2024 | Ghorpade | H04L 67/1097 |
| 2018/0239651 | A1 * | 8/2018 | Gong | G06F 12/0813 |
| 2019/0258613 | A1 * | 8/2019 | Hu | G06F 16/2272 |
| 2022/0308925 | A1 * | 9/2022 | Shilane | G06F 16/162 |
| 2023/0376344 | A1 * | 11/2023 | Jutzi | G06F 9/45558 |

* cited by examiner

*Primary Examiner* — Irene Baker
(74) *Attorney, Agent, or Firm* — Staniford Tomita LLP

(57) ABSTRACT

A file system redirector and proxy (FSRP) service is provided to clients as an entry point to a cluster having a deduplicated file system managing files backed up from the clients. The cluster includes nodes hosting access object (AoB) services as microservices and the file system includes a namespace organizing the files. Data is cached at each node hosting an AoB service. FSRP maintains a list of nodes currently available in the cluster. Upon FSRP receiving a request from a client, a determination is made as to whether the request includes a namespace operation or a file operation. When the request includes the namespace operation, a first algorithm is used to redirect the request to an AoB on the list based on the cached data. When the request includes the file operation, a second algorithm, different from the first algorithm, is used to redirect the request to an AoB on the list based on the cached data.

17 Claims, 8 Drawing Sheets

FILE SYSTEM REDIRECTOR SERVICE IN A SCALE OUT DATA PROTECTION APPLIANCE

TECHNICAL FIELD

The present invention relates generally to information processing systems, and more particularly to large scale file systems.

BACKGROUND

A distributed file system is a type of file system that spans multiple servers, but provides a unified view to clients accessing the file system. A deduplicated file system is a type of file system that seeks to reduce the amount of redundant data that is stored by storing only a single copy of data rather than multiple redundant copies. A cluster refers to a group of interconnected servers that work together to run an application as a single system. Clustering can improve performance, enhance availability, and provide scalability. Typical approaches to distributing incoming network traffic across multiple servers of a cluster do not recognize the unique characteristics and challenges posed when the application running in the cluster is a distributed deduplicated file system.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY

A file system redirector and proxy (FSRP) service is provided to clients as an entry point to a cluster having a deduplicated file system managing files backed up from the clients. The cluster includes nodes hosting access object (AoB) services as microservices and the file system includes a namespace organizing the files. Data is cached at each node hosting an AoB service. FSRP maintains a list of nodes currently available in the cluster. Upon FSRP receiving a request from a client, a determination is made as to whether the request includes a namespace operation or a file operation. When the request includes the namespace operation, a first algorithm is used to redirect the request to an AoB on the list based on the cached data. When the request includes the file operation, a second algorithm, different from the first algorithm, is used to redirect the request to an AoB on the list based on the cached data.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
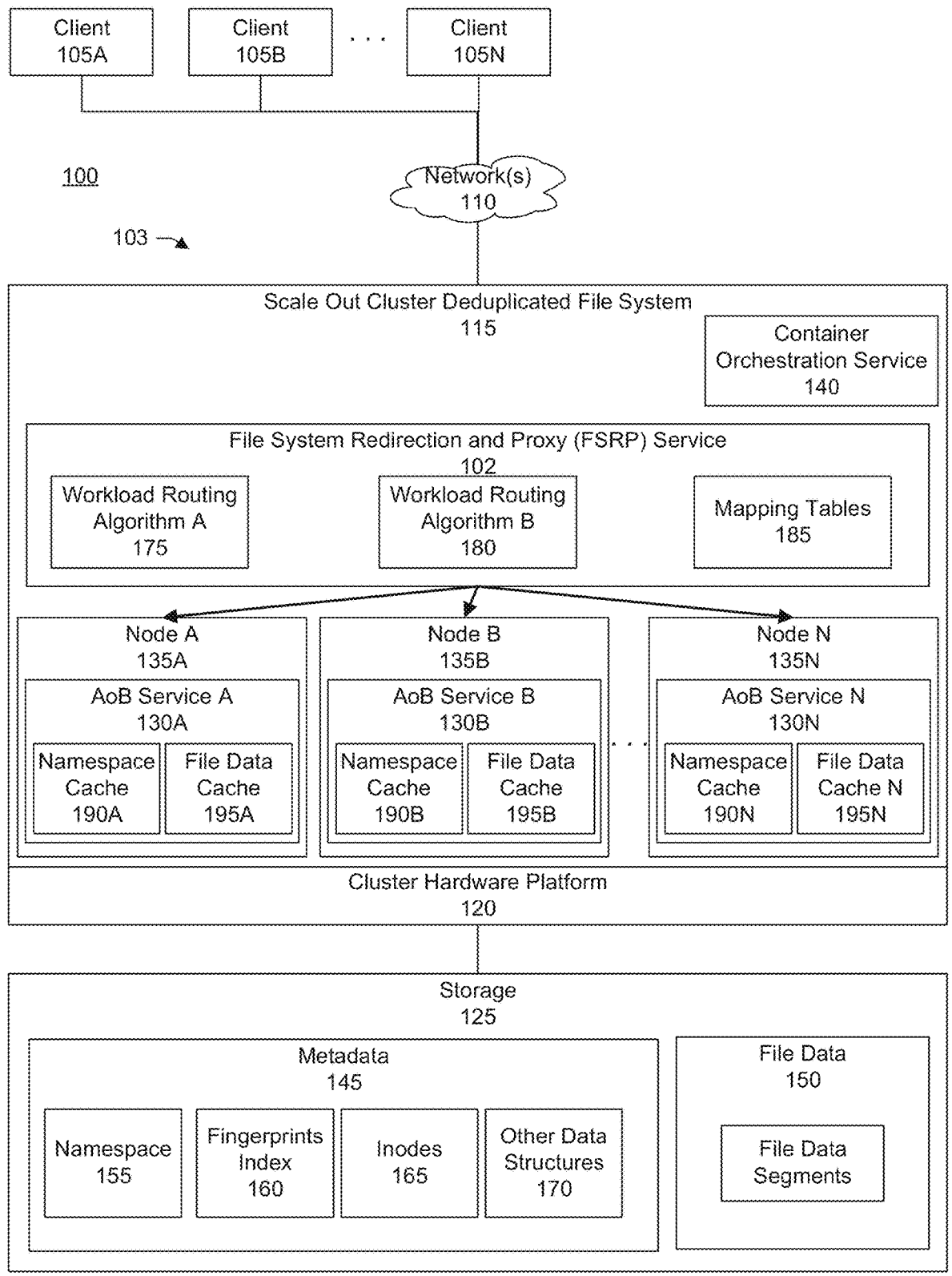
FIG. 1 shows a block diagram of an information processing system having a file system redirection and proxy (FSRP) service, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two.

FIG. 1 shows a block diagram of an information processing system 100 within which methods and systems for a file system redirector and proxy (FSRP) service 102 in a scale out data protection appliance 103 may be implemented. The example shown in FIG. 1 includes a set of clients 105A-N connected via a network 110 to a file system 115 of the appliance. The file system is hosted by an underlying cluster hardware platform 120 and is connected to a storage system 125.

In an embodiment, the file system includes a set of microservices distributed across multiple nodes of a cluster. The services or microservices include the FSRP service and a set of access object (AoB) services 130A-N hosted across nodes 135A-N of the cluster. The services are managed by a container orchestration service 140. An example of a container orchestration service is Kubernetes. Kubernetes is an open-source container-orchestration system for automating computer application deployment, scaling, and management. The data protection appliance may be referred to as a scale-out data protection appliance as file system services can be quickly scaled up or down based on demand.

A container is a virtualized computing environment that runs an application program as a service or, more specifically, microservice. Containers are similar to virtual machines (VMs). Unlike VMs, however, containers have relaxed isolation properties to share the operating system (OS) among the containerized application programs. Containers are thus considered lightweight. Containers can be portable across hardware platforms including clouds because they are decoupled from the underlying infrastructure. Applications may be run by containers as microservices with the container orchestration service facilitating scaling and failover. For example, the container orchestration service can restart containers that fail, replace containers, kill containers that fail to respond to health checks, and withhold advertising them to clients until they are ready to serve.

In an embodiment, the file system services or microservices run inside the virtualized environment provided by the orchestration service as containers. The file system services can run on one or multiple physical or virtual nodes. The file system can be run on premises with dedicated hardware or in a public cloud environment.

The file system receives data protection workload or other file system requests from the clients, processes the requests, and returns results of the processing back to the clients. The storage system stores data written to and generated by the file system including metadata 145 and client or user file data 150. Metadata includes a namespace 155, fingerprints index 160, and inodes 165, among other data structures 170.

The file system provides a way to organize data stored in a storage system and present that data to clients and applications in a logical format. The file system organizes the data into files and folders into which the files may be stored. When a client requests access to a file, the file system issues a file handle or other identifier for the file to the client. The client can use the file handle or other identifier in subsequent operations involving the file. The namespace of the file system provides a hierarchical organizational structure for identifying file system objects through a file path. A file can be identified by its path through a structure of folders and subfolders in the file system. A file system may hold many hundreds of thousands or even many millions of files across many different folders and subfolders and spanning thousands of terabytes.

Figure 2:
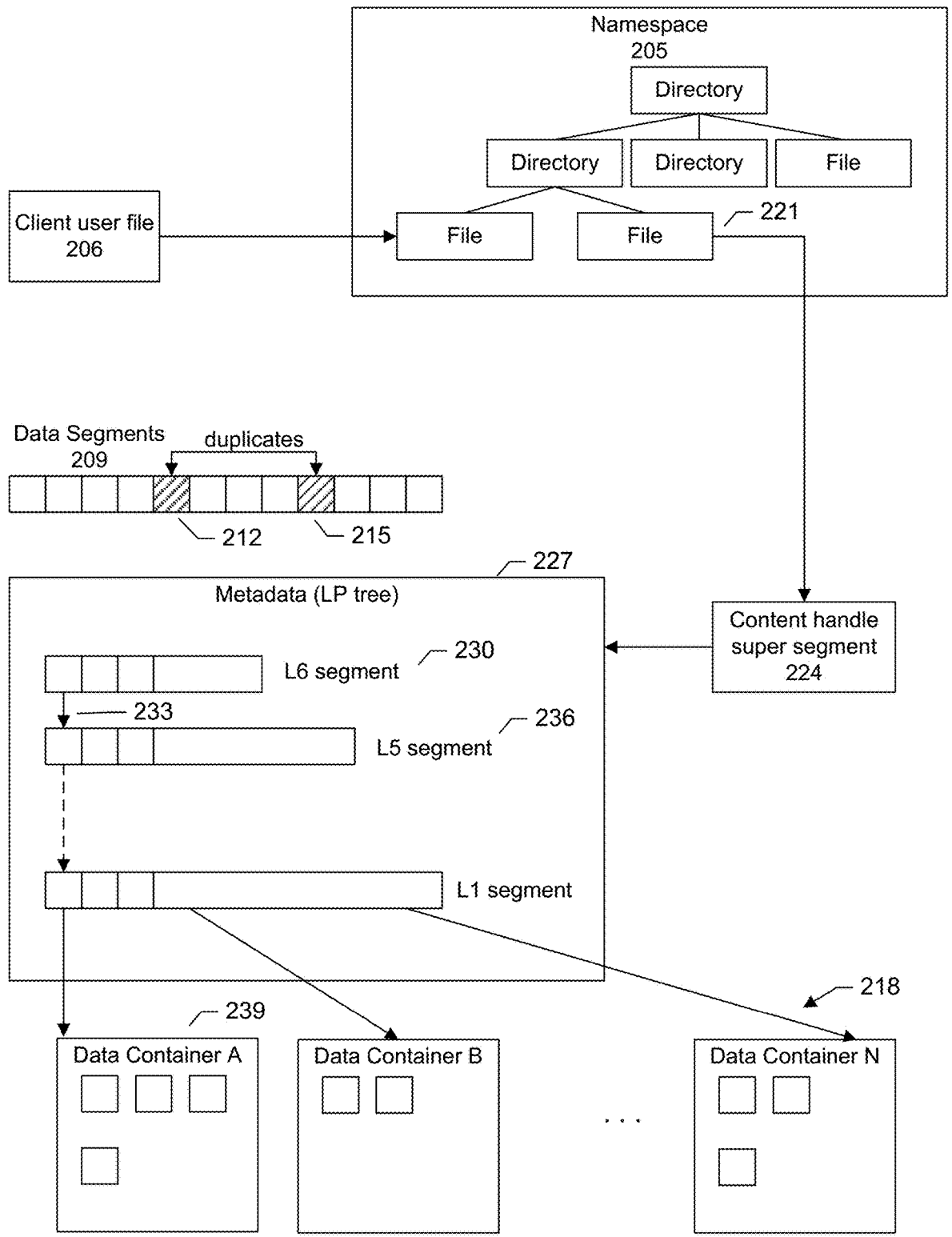
FIG. 2 shows an example of a deduplication process, according to one or more embodiments.

In an embodiment, the file system is a deduplicated file system. FIG. 2 shows a block diagram illustrating a deduplication process of the file system according to one or more embodiments. A deduplicated file system is a type of file system that can reduce the amount of redundant data that is stored. As shown in the example of FIG. 2, the file system maintains a namespace 205. In an embodiment, different nodes of a cluster are responsible for different portions of the namespace and a node may perform deduplication within its assigned portion of the namespace. Further details of a file system namespace are provided in FIG. 3 and the discussion accompanying FIG. 3.

As data, such as incoming client user file 206, enters the file system, it is segmented into data segments 209 and filtered against existing segments to remove duplicates (e.g., duplicate segments 212, 215). A segment that happens to be the same as another segment that is already stored in the file system may not be again stored. This helps to eliminate redundant data and conserve storage space. Metadata, however, is generated and stored that allows the file system to reconstruct or reassemble the file using the already or previously stored segment. Metadata is different from user data. Metadata may be used to track in the file system the location of the user data within a shared storage pool. The amount of metadata may range from about 2 or 4 percent the size of the user data.

More specifically, the file system maintains among other metadata structures a fingerprint index. The fingerprint index includes a listing of fingerprints corresponding to data segments already stored to the storage pool. A cryptographic hash function (e.g., Secure Hash Algorithm 1 (SHA1)) is applied to segments of the incoming file to calculate the fingerprints (e.g., SHA1 hash values) for each of the data segments making up the incoming file. The fingerprints are compared to the existing fingerprints in the fingerprint index. Matching fingerprints indicate that corresponding data segments are already stored. Non-matching fingerprints indicate that the corresponding data segments are unique and should be stored.

Unique data segments are packed and stored in fixed size immutable containers 218. There can be many millions of containers tracked by the file system. The fingerprint index is updated with the fingerprints corresponding to the newly stored data segments. A content handle 221 of the file is kept in the file system's namespace to support the directory hierarchy. The content handle points to a super segment 224 which holds a reference to a top of a segment tree 227 of the file. The super segment points to a top reference 230 that points 233 to metadata 236 and data segments 239.

Thus, in a specific embodiment, each file in the file system may be represented by a tree. The tree includes a set of segment levels arranged into a hierarchy (e.g., parent-child).

Each upper level of the tree includes one or more pointers or references to a lower level of the tree. A last upper level of the tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., child level) that the upper level segment references.

A tree may have any number of levels. The number of levels may depend on factors such as the expected size of files that are to be stored, desired deduplication ratio, available resources, overhead, and so forth. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0s or leaf nodes. In an embodiment, segments in the file system are identified by 24 byte keys (or the fingerprint of a segment), including the LP segments. Each LP segment contains references to lower level LP segments.

Figure 3:
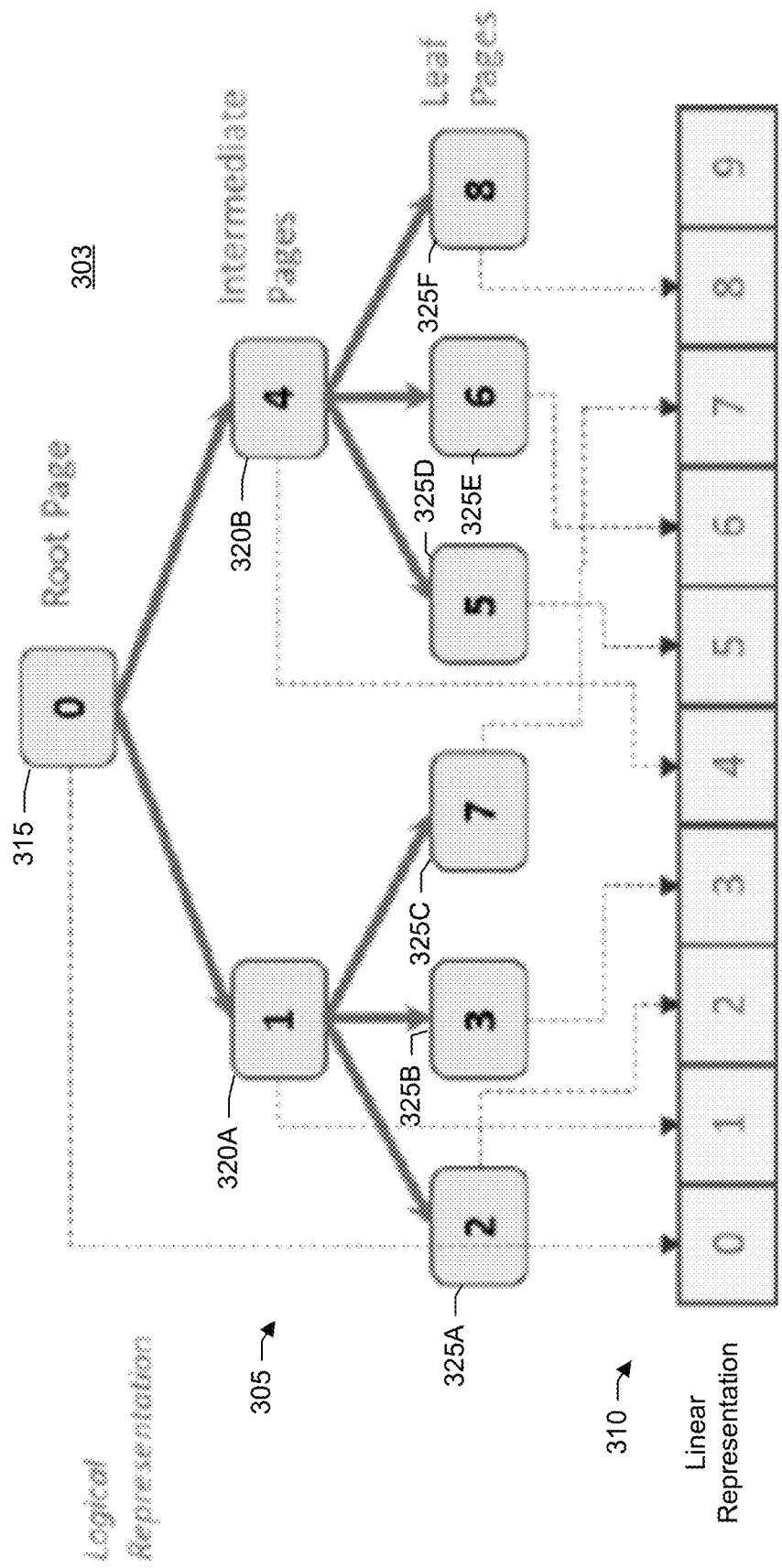
FIG. 3 shows an example of a tree data structure of the namespace, according to one or more embodiments.

FIG. 3 shows further detail of a namespace of the file system. In an embodiment, the namespace is represented by a B+ tree data structure where pages of the tree are written to a key-value store. Page identifiers form the keys of the key-value store and page content form the values of the key-value store. The tree data structure includes the folder and file structure as well as file inodes. FIG. 3 shows an example of a B+ Tree 303 in a logical representation 305 and a linear representation 310. In this example, there is a root page 315, intermediate pages 320A,B, and leaf pages 325A-F. The broken lines shown in FIG. 3 map the pages from their logical representation in the tree to their representation as a linear sequential set of pages on disk, e.g., flattened on-disk layout. In other words, the tree may be represented as a line of pages of data.

The intermediate pages store lookup keys that reference other intermediate or leaf pages. An intermediate page may be referred to as an INT page and references other INT pages or leaf pages by interior keys.

The leaf page contains "key/value" pairs. In an embodiment, a B+ Tree key is a 128-bit number kept in sorted order on the page. It is accompanied by a "value," which is an index to data associated with that key and may be referred to as a "payload." In an embodiment, the 128-bit key includes a 64-bit PID, or parent file ID (the ID of the directory that owns this item), and a 64-bit CID, or child file ID. In an embodiment, the leaf page stores a key for each file in the file system. The key references a payload identifying an inode number of the file and thus a pointer to content or data of the file. There can be another key for each file that identifies a name of the file.

Figure 4:
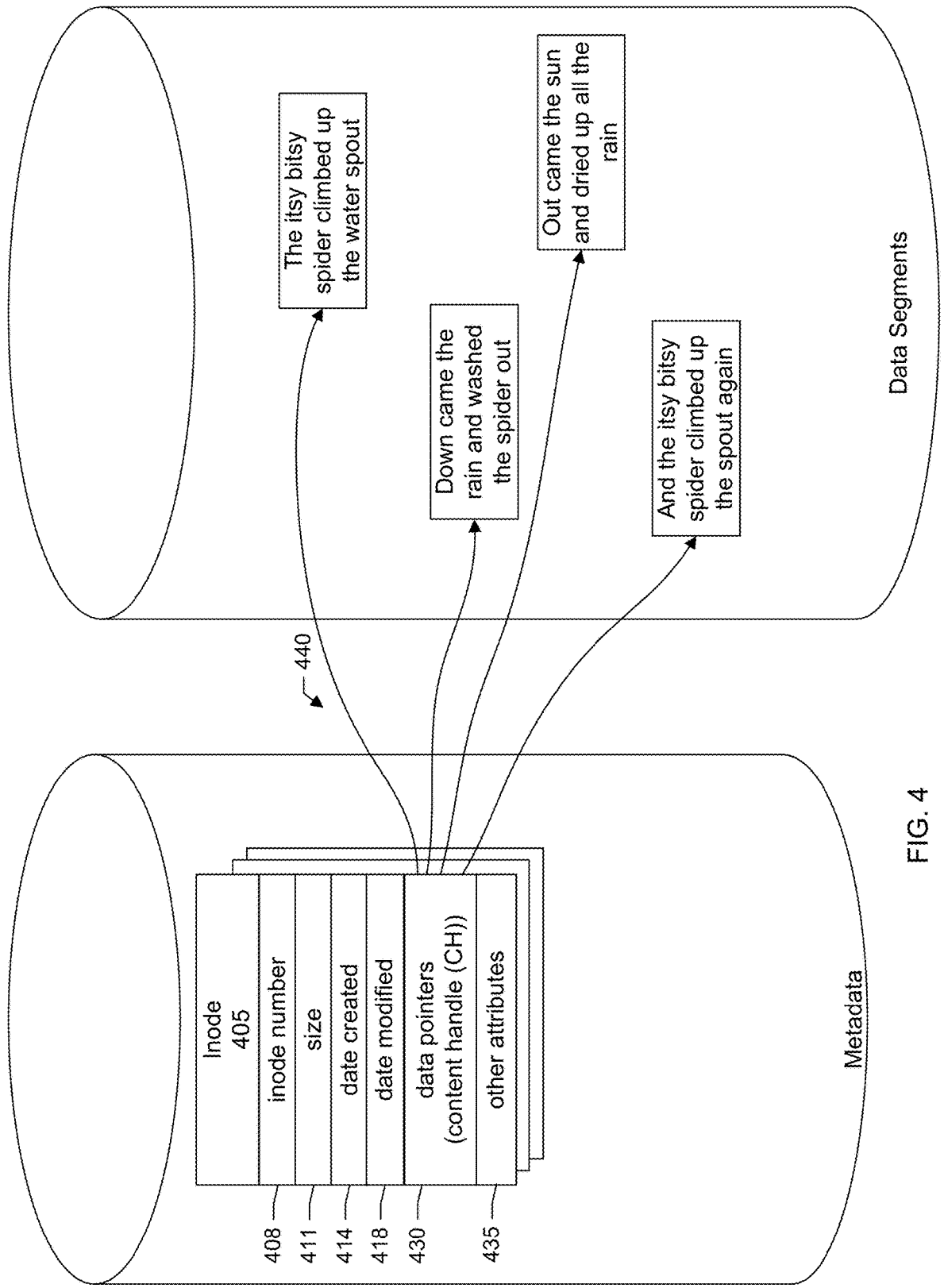
FIG. 4 shows an example of an inode, according to one or more embodiments.

FIG. 4 shows a block diagram of an inode 405. Each file in the file system is associated with an inode. The inode associated with a file stores metadata about the file. The inode includes an inode number 408. The inode number uniquely identifies the inode from among other inodes in the file system. Other attributes of the inode may include a size 411 indicating a size of a file associated with the inode, date created 414 indicating a time and date the file was created, date modified 418 indicating a time and date the file was last modified, a set of data pointers 430, and other attributes 435 (e.g., file owner, file permissions, and so forth). The data pointers store location information or addresses mapping 440 the inode to the actual data.

Referring back now to FIG. 1, requests to the file system including data protection workloads may include operations at different levels of the tree data structure. There can be different types of operations including namespace operations and file operations. An example of a namespace operation includes lookup operations to identify an inode number of a file name. Namespace operations may involve namespace updates such as file and folder creations and generating tree structures for files backed up from the clients. An example of a file operation includes a read or write on a file. File operations may be referred to as data operations as file operations involve actual file input/output (IO) to files.

In an embodiment, a technique of the FSRP service distinguishes between different types of workloads and routes or redirects the requests accordingly to improve overall performance of the file system. In this embodiment, a first type of workload may be referred to as a namespace workload or namespace operation. A second type of workload may be referred to as a file workload or file operation. These different types of workloads consume different levels and types of resources. For example, file workloads can consume a greater amount of CPU resources as compared to namespace workloads. File workloads can involve a longer sequence or series of subsequent operations as compared to namespace workloads. Namespace workloads may involve a single operation or processing of a single remote procedure call (RPC), whereas a file operation, such as a series of writes on a file, may involve multiple RPCs involving the same file.

In an embodiment, the FSRP service includes a first workload routing algorithm 175, a second workload routing algorithm 180, different from the first workload routing algorithm, and mapping tables 185. The first workload routing algorithm may be used to redirect namespace operations to an appropriate AoB. The second workload routing algorithm may be used to redirect file operations to an appropriate AoB, which may be a different (or the same) AoB to which a namespace operation has been redirected. Namespace operations may be owned by directories in which files are kept. Metadata for a directory thus contain information on files held in the directory. The FSRP service differentiates operations happening on a directory, operations happening on a file, and distributes the different workloads accordingly. In an embodiment, a method may include receiving a request from a client to access a file; redirecting the request to a first access object (AoB) service for the first AoB to locate an inode number corresponding to the file; receiving another request from the client to write to the file; and redirecting the other request to a second AoB service, different from the first AoB service, to process the write to the file.

The namespace or, more particularly, Btree data structure having the folder and file structure and file inodes may be shared globally or accessible by any of the AoBs. Thus any AoB can process a namespace operation. At least a portion of a tree structure may be cached at an AoB. Different AoBs may cache different portions of the namespace or tree structure. For example, first AoB service 130A includes a first namespace cache 190A. Second AoB service 130B includes a second namespace cache 190B, different from the first namespace cache, and so forth. A set of first directories may be mapped to the first AoB service. A set of second directories, different from the set of first directories, may be mapped to the second AoB service, and so forth.

The files may be divided into a set of ranges, via hashes of the file handles, with different AoBs assigned responsibility for different ranges of files. A first AoB may be responsible for a first subset of files in the file system. A second AoB may be responsible for a second subset of the files in the file system, different from the first subset of files, and so forth. Different AoBs may cache file data of the different file ranges that they have been assigned. For example, first AoB service includes a first file data cache 195A. Second AoB service includes a second file data cache 195B, different from first file data cache 195A. The first file data cache may cache at least a portion of file data corresponding to a first subset of files assigned to the first AoB service. The second file data cache may cache at least a portion of file data corresponding to a second subset of files assigned to the second AoB service, and so forth.

The mapping tables may include first and second mapping information. The first mapping information may map the different portions of the namespace or tree structures to the corresponding AoBs at which the different portions of the namespace or tree structures are respectively cached. The first mapping information may map the different directories of the namespace to the corresponding AoBs responsible for the respective directories.

The second mapping information may map the different ranges or subsets of files to the corresponding AoBs responsible for the respective ranges. Thus, an operation on a file, followed by a subsequent operation on the same file may be redirected to the same AoB node or instance. Each AoB caches a portion of file data and associated metadata. Thus, routing such traffic to the same AoB improves the likelihood of a cache hit.

The FSRP maintains and updates the mapping tables based on changes in cluster membership so that the entire portion of the namespace and entire range of files can be covered by the AoB nodes currently available or online in the cluster. For example, when a number of AoB instances is reduced, the mapping tables may be updated such that remaining AoB instances assume responsibility of the directories and files that were previously assigned to the now offline AoB instances. When the number of AoB instances is increased, the mapping tables may be updated such that new AoB instances assume responsibility for some of the directories and files previously assigned to the previously present AoB instances, thereby reducing the number of directories and files that the previously present AoB instances were responsible for. The mappings and assignments of directories and files to the AoB instances can be dynamically rebalanced on an on-going basis to account for changes in cluster configuration such as a decrease in the number of AoB instances or an increase in the number of AoB instances.

In an embodiment, the FSRP service consults the mapping tables to determine where a file system request from a client should be routed. For example, a file system request involving a particular directory may be routed to a particular AoB responsible for that particular directory according to the mappings. Operations involving related directories can be routed to the same particular AoB. A file system request involving a particular file may be routed to a particular AoB responsible for that particular file according to the mappings. The FSRP service can use the file handle or directory details that may be included in the client request to identify and select the AoB that should process the request.

The handling of changes in the cluster membership, node presence, or configuration can be transparent to the client. That is, the client can remain unaware of the number AoB instances in the cluster and their particular responsibilities. Rather, the FSRP service maintains up-to-date cluster configuration details such as the IP addresses of the available AoB nodes or services. In an embodiment, when the client wishes to access the file system, the client makes an initial connection to the FSRP service. The FSRP service identifies the particular AoB node or instance that should handle the request and provides the identification to the client. The client can then make a connection to the identified AoB to process the request. Subsequent operations associated with the request can be made directly between the client and particular AoB, thereby bypassing the FSRP service and reducing the number of hops and network overhead. The FSRP service can remain outside of the data path involving file IO, e.g., file reads and file writes.

The FSRP service provides resiliency in cases of node failures. For example, if the particular AoB instance servicing the request goes down, e.g., node hosting the AoB service crashes or suffers a failure, the client can reconnect back to the FSRP service to find a location of a different node that is available. The FSRP service can then identify a different node hosting a different AoB instance that is available or able to continue processing the request and provide the identification, e.g., a new IP address of the available AoB node, to the client.

Figure 5:
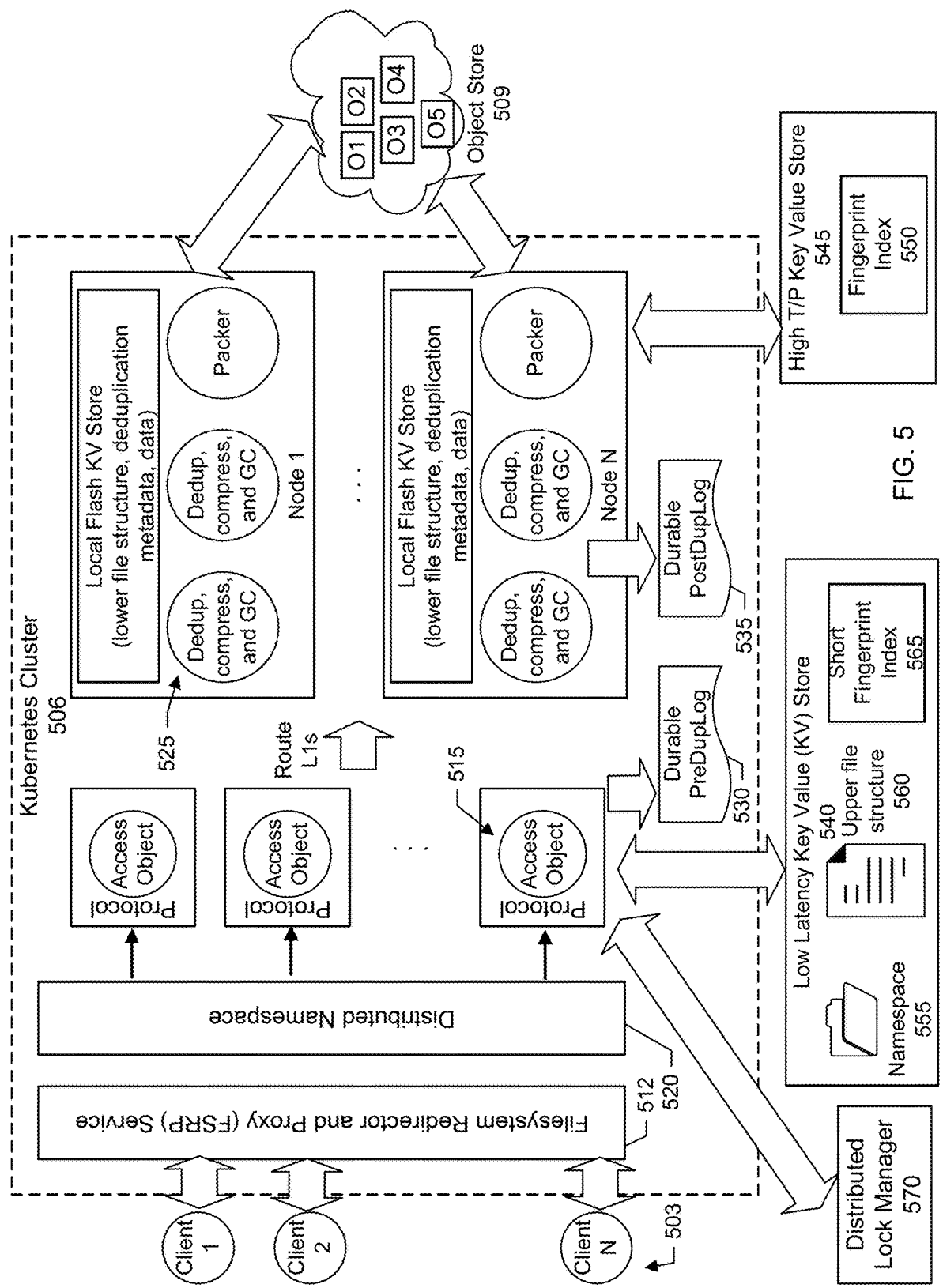
FIG. 5 shows an architecture having an FSRP service, according to one or more embodiments.

FIG. 5 shows an example of an architecture having the FSRP service, according to one or more embodiments. The example shown in FIG. 5 includes a set of clients 503, a cluster 506 at which a deduplicated file system is hosted across nodes of the cluster, and an object store 509 storing file data segments that have been packed into objects. As discussed, in an embodiment, the cluster is a Kuberentes cluster where the file system is provided as a set of microservices. The cluster includes FSRP 512 and a set of nodes hosting a set of AoBs 515 across which a namespace 520 is distributed. AoBs may handle namespace operations, file access requests, file creation, folder creation, file reads, and file writes.

There is another set of nodes hosting other services 525 that handle lower levels of the tree or file structures, such as the L1-L0 segments. Such services may include services for deduplication, compression, garbage collection, and packing of file segments into objects for storage in the object store. The AoBs route the lower level segments including L1s to these other backend services for further processing.

Operations and activities of the services may be recorded in a log. There can be a durable pre-deduplication log 530 used by the AoBs and a durable post-deduplication log 535 used by the backend services. The logs can be used to allow operations to resume following an interruption of a particular service instance.

A key value store may be used to store metadata of the file system. There can be a low latency key value store 540 used by the AoBs and a high throughput key value store 545 used by the backend deduplication, compression, garbage collection, and packing services. The high throughput key value store stores a fingerprint index 550. The low latency key value store stores a namespace 555, upper file structure (e.g., upper segment tree levels) 560, and a short fingerprint index 565.

There can be a distributed lock manager 570 to coordinate file and folder updates by the AoBs to the Btree structure holding the namespace. When an AoB needs to make an update, the AoB acquires from the distributed lock manager a lock on one or more pages of the tree structure and makes the updates.

The file system supports multiple network protocols for accessing the data stored and managed by the file system. Such protocols include Data Domain Boost ("Boost" or "DDBoost"), Network File System (NFS), and Amazon Simple Storage Service (S3), among others. DDBoost is a system that distributes parts of a deduplication process to the application clients, enabling client-side deduplication for faster, more efficient backup and recovery.

In an embodiment, the clients use the DDBoost backup protocol to conduct backups of client data to the storage system, restore the backups from the storage system to the clients, or perform other data protection operations. A DDBoost client library exposes application programming interfaces (APIs) to integrate with the storage system. These API interfaces exported by the DDBoost library provide mechanisms to access or manipulate the functionality of the a Data Domain file system, as provided by Dell Technologies. Embodiments may utilize the DDBoost File System Plug-In (BoostFS), which resides on the client application system and presents a standard file system mount point to the application. With direct access to a BoostFS mount point, the application can leverage the storage and network efficiencies of the DDBoost protocol for backup and recovery. Some embodiments are described in conjunction with the DDBoost protocol, PowerProtect Backup Appliance, and Data Domain file system as provided by Dell Technologies. It should be appreciated, however, that principles and aspects discussed can be applied to other file systems, file system protocols, and backup storage systems.

In an embodiment, the FSRP service provides a storage service endpoint for redirecting the data protection traffic in the data protection appliance to load-balance workload among cluster backend services. The protection storage service end point in the data protection appliance redirects data protection traffic to one of the cluster backend services enabling the service to load-balance the workload among available AoB services of the cluster. In an embodiment, the FSRP service provides the entry point for a data path in the data protection appliance. The clients initially connect to this FSRP service which then determines the AoB service where the request can be redirected.

In an embodiment, the data protection appliance includes a data protection stack, built on a software defined microservices-based architecture. This stack can be deployed on a qualified Kubernetes (K8s) infrastructure running on-premises environment or in the public cloud. The on-premises appliance form factor can bring together the following: 1) A set of nodes that include the required compute and storage to satisfy a defined per-node usable capacity. 2) A dedicated and redundant network switch fabric for both external and internal connectivity. 3) An application stack comprising of supporting infrastructure services, protection storage services and protection software services. The FSRP service can be provided as a protection storage service.

As discussed, FSRP is a service that provides the entry point for a data-path. In an embodiment, at the start of backup/restore operations, the clients (e.g., DataDomain Boost clients) talk with the FSRP service to obtain the internet protocol (IP) address of the back-end nodes. These backend nodes may be referred to as Access Object services.

A customer environment can include many backup application clients that rely on a single data protection appliance to protect their workloads. As discussed, a client may use the Boost (or other protocol) for communication. The number of clients can be in the thousands. It is desirable that the data protection appliance can serve seamlessly the enormous number of requests from all clients. As discussed, in an embodiment, FSRP is a protection storage service that provides the entry point for a data-path. FSRP may include a Kubernetes load balancer service to provide load-balancing abilities for incoming traffic to distribute evenly among the multiple available AoB service for better performance and high availability.

In case of the data protection appliance, a simple load balancer service that routes the workload protection request to the list of AoB services will not work or provide the desired level of performance. This can be due, at least in part, to the complexities of a distributed deduplicated file system that is managing large amounts of data, supporting thousands of clients concurrently, providing good deduplication ratios, ensuring data integrity, and providing responsive performance. File system protocols require handling complexities such as namespace updates including file and folder creation and deletion as well as random IO reads and writes to files.

In an embodiment, FSRP along with distributing incoming traffic evenly among the multiple available AoBs, attempts to route the incoming workload protection request of a given file or directory to the same node, i.e., AoB service. There are multiple benefits of routing the incoming workload protection request to the same AoB service. In particular, as discussed, file data/metadata is cached in the node/AoB service. Hence routing the request to the same node/AoB service helps to ensure that cache invalidations are reduced. Further, namespace data is also cached as pages in the node/AoB service. So routing the request to the same node/AoB service allows for reducing namespace page invalidations.

In an embodiment, the FSRP service running in the cluster exposes external and internal IP addresses for the external and internal communication. At the start of backup/restore operations, the client backup applications may use a protocol (e.g., Boost protocol) to initially talk with the FSRP service using the FSRP's configured external IP address. FSRP then determines out the AoB where the client request should be redirected. FSRP maintains an up-to-date list of all the AoBs currently available/running on the protection appliance.

FSRP is responsible for updating this AoB list post or after AoB scale-up and scale-down events. For example, a number of instances of an AoB service may change from a first number to a second number, different from the first number. The change may be the result of an instance of the AoB service being added, an instance or node hosting the AoB service crashing, an increase in demand, a decrease in demand, or other reason. The FSRP service communicates with the orchestration service to monitor or detect changes in cluster membership of the AoBs and updates the AoB list. For example, when a particular AoB service, node, or instance joins the cluster, FSRP may add the particular AoB service to the list, e.g., add IP address at which the particular AoB service can be reached. When a particular AoB service, node, or instance leaves the cluster, FSRP may remove the particular AoB service from the list.

To load-balance the data protection traffic among the available AoB services, FSRP uses an algorithm to determine the AoB where the client request should be routed. This algorithm utilizes the handle of the object being protected (e.g., file/directory) to help ensure that the same (or a consistent) AoB service is selected for redirection for the same object (file/directory).

The AoBs share the same distributed namespace and can operate on any file/directory as part of a data protection workflow. So incase if any of the AoB services fails or is not available for the workflow, the client can reconnect to FSRP again to fetch the details of another AoB service currently available/running on the protection appliance. The client after obtaining the details of the new AoB service details can then redirect all the workload to this new AoB service as part of a data protection workflow.

FSRP, as a protection storage service, helps to ensure that the incoming workload traffic is evenly distributed among the available multiple AoB services for better performance and high availability. FSRP maintains an updated list of the AoB services currently available on the cluster. This cluster membership is transparent to the clients (e.g., DDBoost clients) talking with FSRP service for the data protection. The FSRP balances the data protection traffic among the AoB services in the data protection appliance. If a particular AoB services fails, the client can reconnect to FSRP and be redirected to another node hosting another AoB service in the system.

Figure 6:
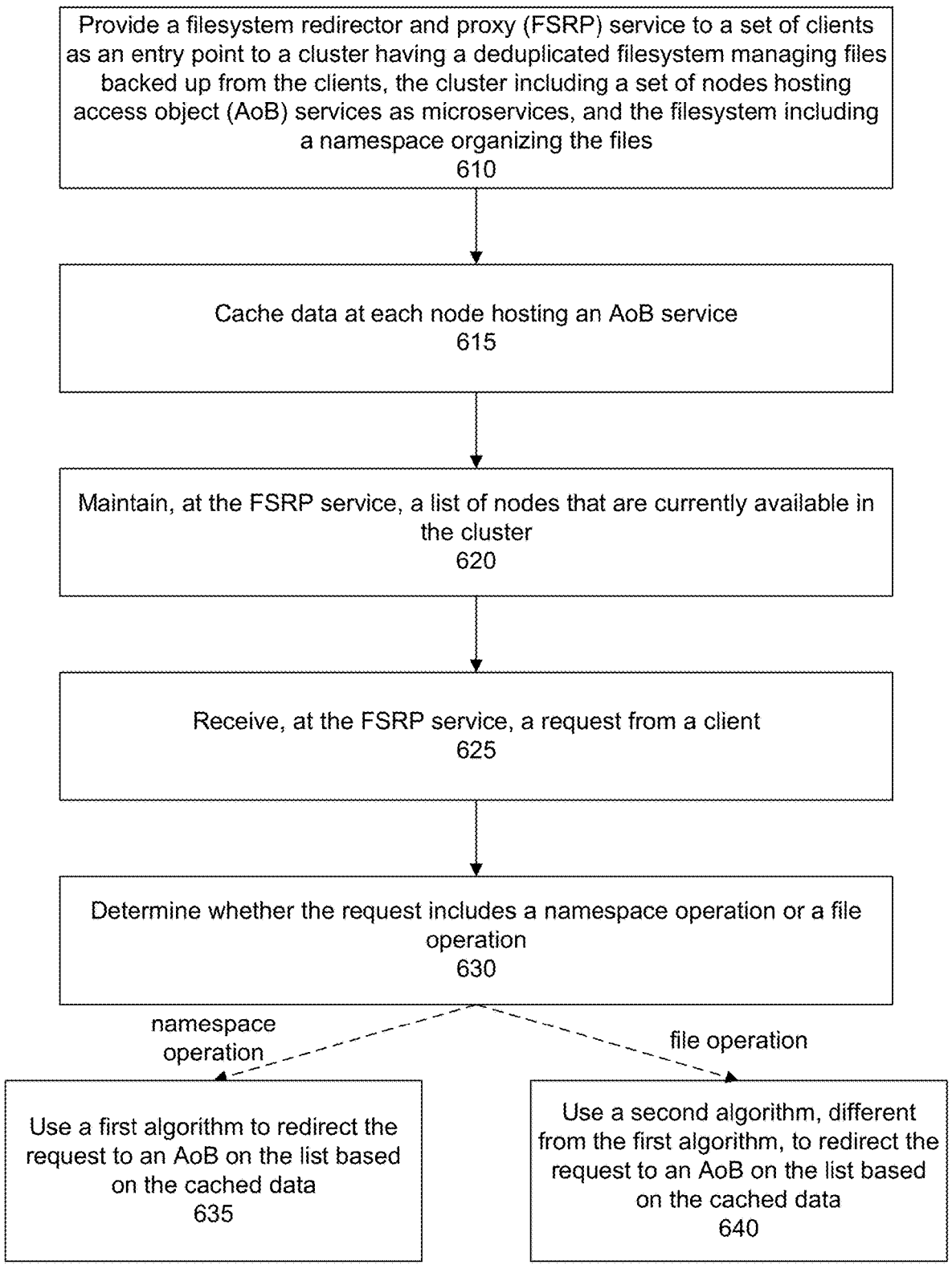
FIG. 6 shows a flow of the FSRP service, according to one or more embodiments.

FIG. 6 shows an overall flow of the FSRP service, according to one or more embodiments. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 610, a file system redirector and proxy (FSRP) service is provided to a set of clients as an entry point to a cluster having a deduplicated file system managing files backed up from the clients. The cluster includes a set of nodes hosting access object (AoB) services as microservices. The file system includes a namespace organizing the files.

In a step 615, data is cached at each node hosting an AoB service. In an embodiment, the cached data includes first and second caches. The first cache includes namespace data. The cached namespace data may include a subset of Btree pages. The pages may include leaf pages holding keys for the files in the file system. The namespace may be partitioned for caching such that a cache at a particular AoB service includes a set of lower level tree pages where each lower level page is immediately referenced by an upper level page.

The second cache includes file data. As discussed, in an embodiment, each node hosting an AoB service is assigned responsibility for handling a particular range of files. In an embodiment, a particular node hosting an AoB service and assigned a particular range of files includes at least some file data or metadata from the particular range of files in a cache. Caching file data or associated metadata at the node can speed file operations on files in the particular range such as reads on a file.

In a step 620, the FSRP service maintains a list of nodes hosting the AoB service that are currently available in the cluster.

In a step 625, the FSRP service receives a request from a client. The request may be received as a remote procedure call (RPC) issued by the client.

In a step 630, the FSRP service determines whether the request includes a namespace operation or a file operation.

If the request includes a namespace operation, in a step 635, the FSRP service uses a first algorithm to redirect the request to an AoB on the list based on the cached data (e.g., first cache). Alternatively, if the request includes a file operation, in a step 640, the FSRP service uses a second algorithm, different from the first algorithm, to redirect the request to an AoB on the list based on the cached data (e.g., second cache).

In an embodiment, the redirection is performed by the FSRP replying to the RPC from the client with an IP address of a node hosting an AoB service where the request should be made. Thereafter, subsequent operations associated with the initial request to the FSRP may be made directly from the client to the AoB node, bypassing the FSRP service.

The first and second workload routing algorithms may take into account factors such as the data caches at the AoB nodes, mapping assignments of namespace partitions, mapping assignments of file ranges, number of active connections a node may have, node response time, randomness, other factors, or combinations of these. Factors, however, may be weighted differently depending on the different types of workloads (e.g., namespace operations versus file operations) to thereby reflect the different levels of processing required for the different types of workloads.

For example, since the AoBs share the same distributed namespace, the first workload algorithm for namespace operations may be less strict about which AoB is identified or selected to process a namespace operation as compared to the second workload algorithm for file operations where each AoB is assigned responsibility for a particular range of files.

Further, namespace operations are typically single operations, e.g., single lookup to identify an inode number for a file name. In contrast, file operations such as reading or writing a file typically involve a longer sequence of operations and more CPU demands. For example, a file to be written may be segmented and placed into a queue where multiple threads then access the queue to pick up a file segment for copying. More consistent routing of a file operation to a particular AoB node can have a greater overall performance of the file system as compared to a namespace operation.

The first workload routing algorithm, second workload routing algorithm, or both may prioritize a likelihood of a cache-hit at a particular AoB node over achieving a uniform distribution of a number of client requests over the AoB nodes. For namespace operations, different directories may be mapped to different AoB nodes. Similarly, for file operations, different file ranges may be mapped to different AoB nodes. These mappings can be used for consistent routings of requests in order to increase the likelihood of cache hits.

Further, for namespace operations, cache invalidations are reduced because the likelihood of some other AoB node making a modification to a particular portion of the namespace or particular set of directories is reduced. Due to the nature of the distributed file system, greater benefits can be realized from cache hits and reuse of data in the cache at a particular AoB node as compared to the costs of requests being routed to the same particular AoB node for processing. Consistent routing to the AoB nodes for data protection traffic such as backups exploits the presence of cached data at the AoB nodes and can reduce the amount of time required to complete a backup.

In an embodiment, a method includes: providing a file system redirector and proxy (FSRP) service to a plurality of clients as an entry point to a cluster having a deduplicated file system managing files backed up from the clients, the cluster comprising a plurality of nodes hosting access object (AoB) services as microservices, and the deduplicated file system comprising a namespace organizing the files; caching data at each node hosting an AoB service; maintaining, at the FSRP service, a list of nodes that are currently available in the cluster; receiving, at the FSRP service, a request from a client; determining whether the request comprises a namespace operation or a file operation; when the request comprises the namespace operation, using a first algorithm to redirect the request to an AoB on the list based on the cached data; and when the request comprises the file operation, using a second algorithm, different from the first algorithm, to redirect the request to an AoB on the list based on the cached data.

Caching data at each node hosting an AoB service may include: caching a portion of file data and a portion of namespace data. In an embodiment, the when the request comprises the file operation further comprises: after redirection of the request comprising the file operation to the AoB on the list, bypassing the FSRP service for subsequent connections from the client involving a file associated with the file operation.

In an embodiment, the method further includes: detecting a change in a number of the plurality of nodes hosting the AoB services; and based on the change, updating the list of nodes that are currently available in the cluster and the cached data.

In an embodiment, the first and second algorithms prioritize likelihoods of a cache hit over a uniform distribution of a number of client requests across the plurality of nodes. In an embodiment, the namespace comprises tree data structures representing the files.

In another embodiment, there is a system comprising: a processor; and memory configured to store one or more sequences of instructions which, when executed by the processor, cause the processor to carry out the steps of: providing a file system redirector and proxy (FSRP) service to a plurality of clients as an entry point to a cluster having a deduplicated file system managing files backed up from the clients, the cluster comprising a plurality of nodes hosting access object (AoB) services as microservices, and the deduplicated file system comprising a namespace organizing the files; caching data at each node hosting an AoB service; maintaining, at the FSRP service, a list of nodes that are currently available in the cluster; receiving, at the FSRP service, a request from a client; determining whether the request comprises a namespace operation or a file operation; when the request comprises the namespace operation, using a first algorithm to redirect the request to an AoB on the list based on the cached data; and when the request comprises the file operation, using a second algorithm, different from the first algorithm, to redirect the request to an AoB on the list based on the cached data.

In another embodiment, there is a computer program product, comprising a non-transitory computer-readable medium having a computer-readable program code embodied therein, the computer-readable program code adapted to be executed by one or more processors to implement a method comprising: providing a file system redirector and proxy (FSRP) service to a plurality of clients as an entry point to a cluster having a deduplicated file system managing files backed up from the clients, the cluster comprising a plurality of nodes hosting access object (AoB) services as microservices, and the deduplicated file system comprising a namespace organizing the files; caching data at each node hosting an AoB service; maintaining, at the FSRP service, a list of nodes that are currently available in the cluster; receiving, at the FSRP service, a request from a client; determining whether the request comprises a namespace operation or a file operation; when the request comprises the namespace operation, using a first algorithm to redirect the request to an AoB on the list based on the cached data; and when the request comprises the file operation, using a second algorithm, different from the first algorithm, to redirect the request to an AoB on the list based on the cached data.

Referring back now to FIG. 1, the clients may include servers, desktop computers, laptops, tablets, smartphones, internet of things (IoT) devices, or combinations of these. The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The storage system may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, shared storage pool, or an object or cloud storage service. In an embodiment, storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, storage may represent logical storage that includes any number of physical storage devices connected to form a logical storage.

In an embodiment, the clients may be referred to as backup clients. In this embodiment, the file system provides a backup target for data generated by the clients. In an embodiment, the file system is hosted by a cluster of nodes (e.g., two or more nodes). Depending on demand, cluster nodes or services may be dynamically scaled up or down. Thus, the cluster may be referred to as a scale out cluster. For example, as part of on-going operations, new nodes or new instances of a service may be added to the cluster or existing nodes or instances of a service may be removed from the cluster.

Figure 7:
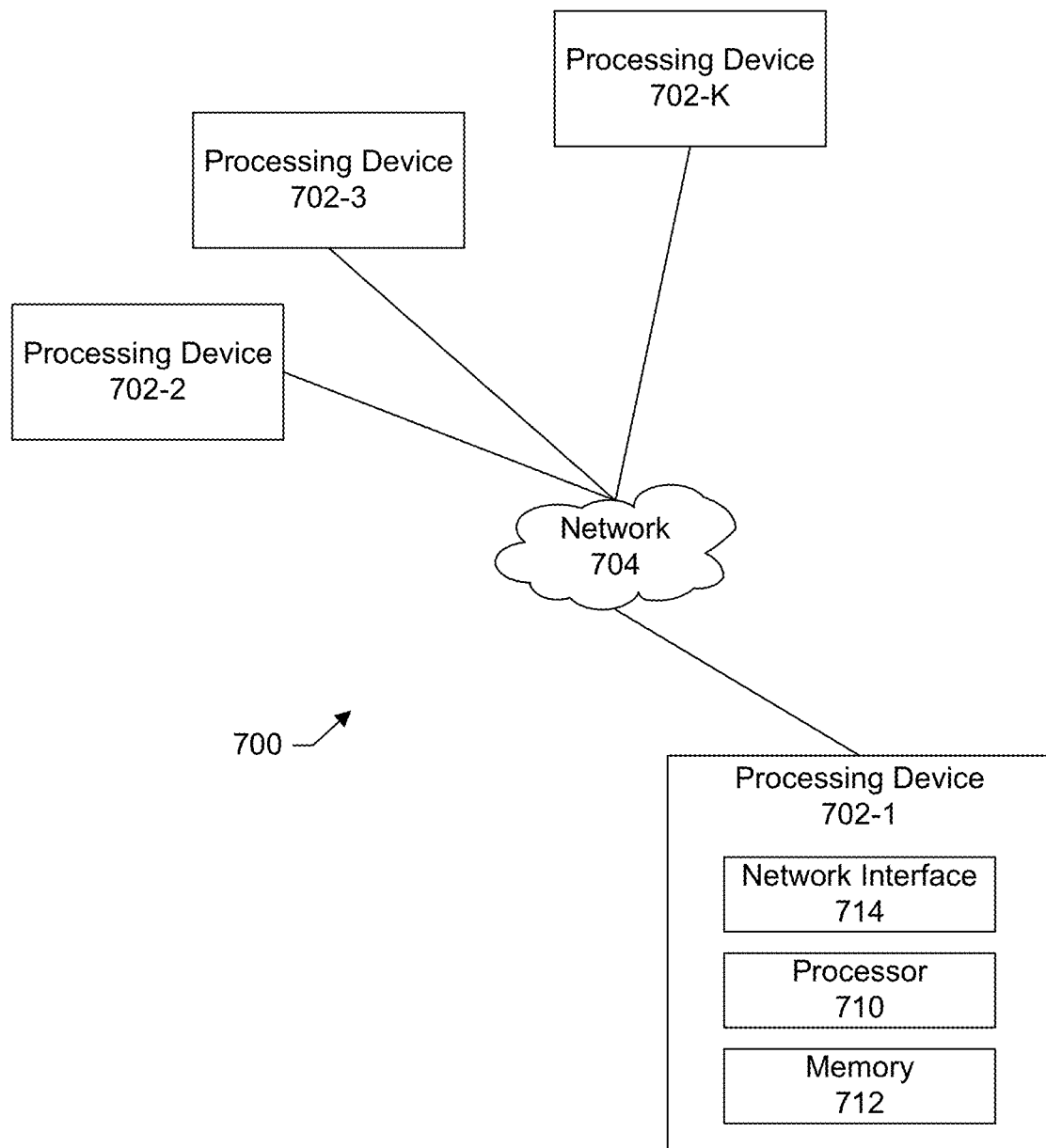
FIG. 7 shows a block diagram of a processing platform that may be utilized to implement at least a portion of an information processing system, according to one or more embodiments.

FIG. 7 shows an example of a processing platform 700 that may include at least a portion of the information handling system shown in FIG. 1. The example shown in FIG. 7 includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 8:
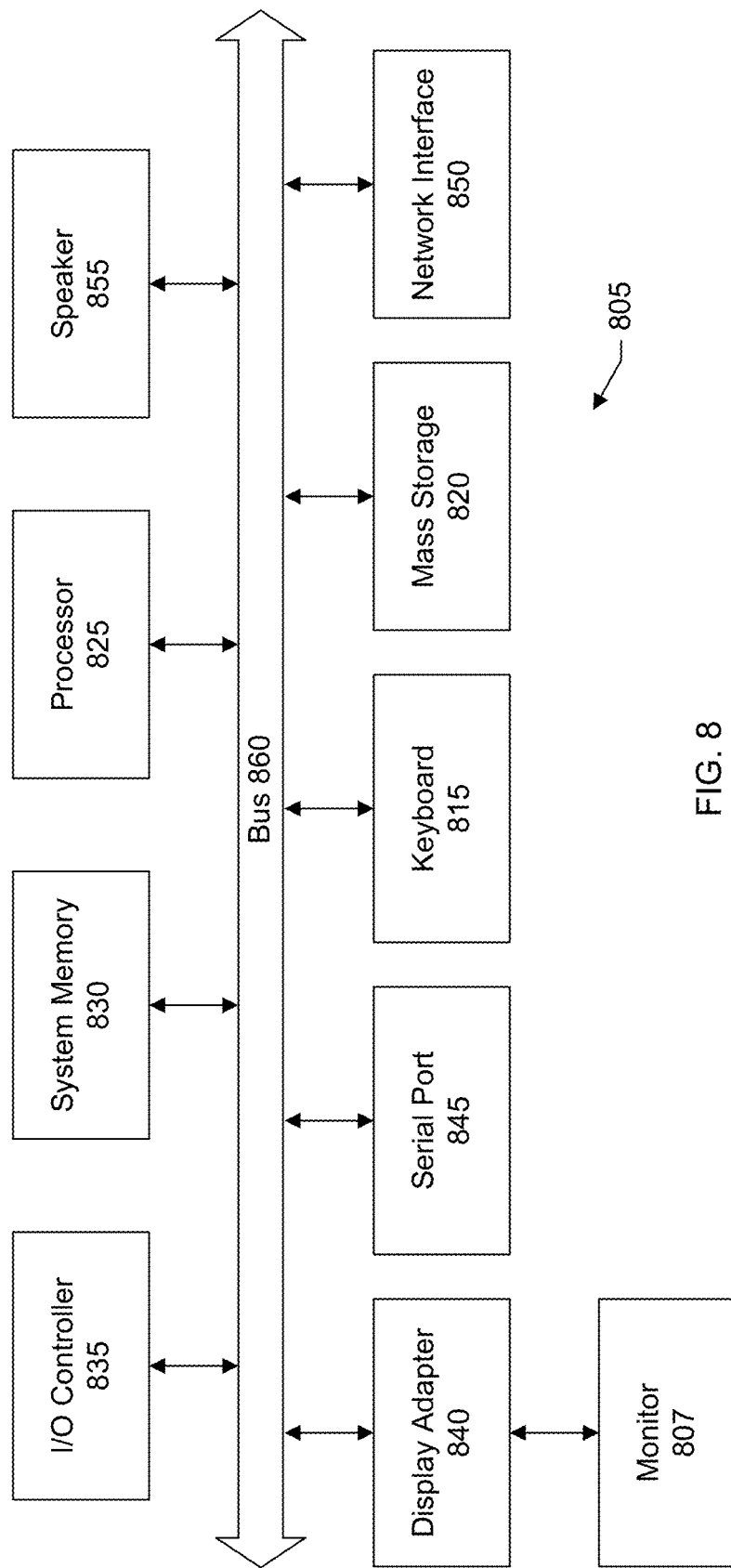
FIG. 8 shows a block diagram of a computer system suitable for use with the system, according to one or more embodiments.

FIG. 8 shows a system block diagram of a computer system 805 used to execute the software of the present system described herein. The computer system includes a monitor 807, keyboard 815, and mass storage devices 820. Computer system 805 further includes subsystems such as central processor 825, system memory 830, input/output (I/O) controller 835, display adapter 840, serial or universal serial bus (USB) port 845, network interface 850, and speaker 855. The system may also be used with computer systems with additional or fewer subsystems. For example, a computer system could include more than one processor 825 (i.e., a multiprocessor system) or a system may include a cache memory.

Arrows such as 860 represent the system bus architecture of computer system 805. However, these arrows are illustrative of any interconnection scheme serving to link the subsystems. For example, speaker 855 could be connected to the other subsystems through a port or have an internal direct connection to central processor 825. The processor may include multiple processors or a multicore processor, which may permit parallel processing of information. Computer system 805 shown in FIG. 8 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
providing a file system redirector and proxy (FSRP) service to a plurality of clients as an entry point to a cluster having a deduplicated file system managing files backed up from the clients, the cluster comprising a plurality of nodes hosting access object (AoB) services as microservices, and the deduplicated file system comprising a namespace organizing the files;
caching data at each node hosting an AoB service, the cached data comprising a subset of pages from a Btree representing the namespace, the pages being written to a key-value store and holding keys for the files, the keys identifying inode numbers to inodes of the files, the inodes comprising pointers to file data of the files;
maintaining, at the FSRP service, a list of nodes that are currently available in the cluster;
receiving, at the FSRP service, a request from a client;
determining, by the FSRP service, whether the request comprises a namespace operation or a file operation, the namespace operation comprising a lookup operation to identify an inode number of a file, and the file operation comprising one of writing to or reading from the file;
when the request comprises the namespace operation, using, by the FSRP service, a first algorithm to redirect the request to an AoB on the list based on the cached data; and
when the request comprises the file operation, using, by the FSRP service, a second algorithm, different from the first algorithm, to redirect the request to an AoB on the list based on the cached data, wherein based on the first algorithm, the request for the namespace operation comprising the lookup operation to identify the inode number of the file is redirected to a first AoB, and
wherein based on the second algorithm, the request for the file operation comprising the one of writing to or reading from the file is redirected, by the FSRP service, to a second AoB, different from the first AoB, the redirection to the second AoB comprising the FSRP service returning an internet protocol (IP) address of the second AoB to the client, and the client connecting to the second AoB using the IP address of the second AoB,
wherein upon the second AoB completing the file operation comprising the one of writing to or reading from the file, the client bypasses the FSRP service for subsequent file operations by issuing another request for another file operation directly to the second AoB, the another request for another file operation comprising another one of writing to or reading from the file.

2. The method of claim 1 wherein the caching data at each node hosting an AoB service further comprises:
caching a portion of file data and a portion of namespace data.

3. The method of claim 1 further comprising:
detecting a change in a number of the plurality of nodes hosting the AoB services; and
based on the change, updating the list of nodes that are currently available in the cluster and the cached data.

4. The method of claim 1 wherein the first algorithm prioritizes a likelihood of a cache hit over a uniform distribution of a number of client requests across the plurality of nodes.

5. The method of claim 1 wherein the namespace comprises tree data structures representing the files.

6. A system comprising: a processor; and memory configured to store one or more sequences of instructions which, when executed by the processor, cause the processor to carry out the steps of:
providing a file system redirector and proxy (FSRP) service to a plurality of clients as an entry point to a cluster having a deduplicated file system managing files backed up from the clients, the cluster comprising a plurality of nodes hosting access object (AoB) services as microservices, and the deduplicated file system comprising a namespace organizing the files;
caching data at each node hosting an AoB service, the cached data comprising a subset of pages from a Btree representing the namespace, the pages being written to a key-value store and holding keys for the files, the keys identifying inode numbers to inodes of the files, the inodes comprising pointers to file data of the files;
maintaining, at the FSRP service, a list of nodes that are currently available in the cluster;
receiving, at the FSRP service, a request from a client;
determining, by the FSRP service, whether the request comprises a namespace operation or a file operation, the namespace operation comprising a lookup operation to identify an inode number of a file, and the file operation comprising one of writing to or reading from the file;
when the request comprises the namespace operation, using, by the FSRP service, a first algorithm to redirect the request to an AoB on the list based on the cached data; and
when the request comprises the file operation, using, by the FSRP service, a second algorithm, different from the first algorithm to redirect the request to an AoB on the list based on the cached data, wherein based on the first algorithm, the request for the namespace operation comprising the lookup operation to identify the inode number of the file is redirected to a first AoB, and
wherein based on the second algorithm, the request for the file operation comprising the one of writing to or reading from the file is directed, by the FSRP service, to a second AoB, different from the first AoB, the redirection to the second AoB comprising the FSRP service returning an internet protocol (IP) address of the second AoB to the client, and the client connecting to the second AoB using the IP address of the second AoB,
wherein upon the second AoB completing the file operation comprising the one of writing to or reading from the file, the client bypasses the FSRP service for subsequent file operations by issuing another request for another file operation directly to the second AoB, the another request for another file operation comprising another one of writing to or reading from the file, wherein namespace operations are owned by directories in which files are kept and the processor further carries out the steps of:

differentiating between operations on the namespace and operations on the files, the operations on the namespace comprising looking up names of the files kept in the namespace, and the operations on the files comprising reading and writing the files; and distributing, to the AoB services, the operations on the namespace differently from distributing, to the AoB services, the operations on the files.

7. The system of claim 6 wherein the caching data at each node hosting an AoB service further comprises:

caching a portion of file data and a portion of namespace data.

8. The system of claim 6 wherein the processor further carries out the steps of:

detecting a change in a number of the plurality of nodes hosting the AoB services; and based on the change, updating the list of nodes that are currently available in the cluster and the cached data.

9. The system of claim 6 wherein the first algorithm prioritizes a likelihood of a cache hit over a uniform distribution of a number of client requests across the plurality of nodes.

10. The system of claim 6 wherein the namespace comprises tree data structures representing the files.

11. A computer program product, comprising a non-transitory computer-readable medium having a computer-readable program code embodied therein, the computer-readable program code adapted to be executed by one or more processors to implement a method comprising:

providing a file system redirector and proxy (FSRP) service to a plurality of clients as an entry point to a cluster having a deduplicated file system managing files backed up from the clients, the cluster comprising a plurality of nodes hosting access object (AoB) services as microservices, and the deduplicated file system comprising a namespace organizing the files;

caching data at each node hosting an AoB service, the cached data being different at different AoB services and comprising a subset of pages from a Btree representing the namespace, the pages being written to a key-value store and holding keys for the files, the keys identifying inode numbers to inodes of the files, the inodes comprising pointers to file data of the files;

maintaining, at the FSRP service, a list of nodes that are currently available in the cluster;

receiving, at the FSRP service, a request from a client;

determining, by the FSRP service, whether the request comprises a namespace operation or a file operation, the namespace operation comprising a lookup operation to identify an inode number of a file, and the file operation comprising one of writing to or reading from the file;

when the request comprises the namespace operation, using, by the FSRP service, a first algorithm to redirect the request to an AoB on the list based on the cached data; and when the request comprises the file operation, using, by the FSRP service, a second algorithm, different from the first algorithm to redirect the request to an AoB on the list based on the cached data, wherein based on the first algorithm, the request for the namespace operation comprising the lookup operation to identify the inode number of the file is redirected to a first AoB, and wherein based on the second algorithm, the request for the file operation comprising the one of writing to or reading from the file is redirected to a second AoB, different from the first AoB, the redirection to the second AoB comprising the FSRP service returning an internet protocol (IP) address of the second AoB to the client, and the client connecting to the second AoB using the IP address of the second AoB, wherein upon the second AoB completing the file operation comprising the one of writing to or reading from the file, the client bypasses the FSRP service for subsequent file operations by issuing another request for another file operation directly to the second AoB, the another request for another file operation comprising another one of writing to or reading from the file, wherein namespace operations are owned by directories in which files are kept and the method further comprises:

differentiating between operations on the namespace and operations on the files, the operations on the namespace comprising looking up names of the files kept in the namespace, and the operations on the files comprising reading and writing the files; and distributing, to the AoB services, the operations on the namespace differently from distributing, to the AoB services, the operations on the files, and wherein the first and second algorithms comprise differently weighted factors to redirect the request based on whether the request comprises the lookup operation or the one of writing to or reading from the file, the differently weighted factors indicative of a greater amount of CPU resources is consumed by the one of writing to or reading from the file as compared to the lookup operation.

12. The computer program product of claim 11 wherein the caching data at each node hosting an AoB service further comprises:

caching a portion of file data and a portion of namespace data.

13. The computer program product of claim 11 wherein the method further comprises:

detecting a change in a number of the plurality of nodes hosting the AoB services; and based on the change, updating the list of nodes that are currently available in the cluster and the cached data.

14. The computer program product of claim 11 wherein the first algorithm prioritizes a likelihood of a cache hit over a uniform distribution of a number of client requests across the plurality of nodes.

15. The computer program product of claim 11 wherein the namespace comprises tree data structures representing the files.

16. The method of claim 1 wherein namespace operations are owned by directories in which files are kept and the method further comprises:

differentiating between operations on the directories and operations on the files, the operations on the directories comprising looking up names of the files kept in the directories, and the operations on the files comprising reading and writing the files; and distributing, to the AoB services, the operations on the directories differently from distributing, to the AoB services, the operations on the files.

17. The method of claim 1 wherein the first and second algorithms comprise differently weighted factors to redirect the request based on whether the request comprises the lookup operation or the one of writing to or reading from the file, the differently weighted factors indicative of a greater amount of CPU resources is consumed by the one of writing to or reading from the file as compared to the lookup operation.

* * * * *